United States Patent [19]

Maynard

[11] Patent Number: 4,998,742
[45] Date of Patent: Mar. 12, 1991

[54] MULTI-PURPOSE PORTABLE WORKBENCH CART

[76] Inventor: Arthur W. Maynard, 4608 Hickory St., Pascagoula, Miss. 39567

[21] Appl. No.: 330,892

[22] Filed: Mar. 31, 1989

[51] Int. Cl.⁵ .............................................. B62B 3/02
[52] U.S. Cl. .................................. 280/35; 280/47.35; 280/79.11; 280/659
[58] Field of Search ............... 280/47.18, 47.34, 47.35, 280/47.24, 47.25, 47.19, 47.18, 79.11, 79.3, 651, 652, 35, 639, 659

[56] References Cited

U.S. PATENT DOCUMENTS

| | | | |
|---|---|---|---|
| 996,636 | 7/1911 | Gabriel | 280/47.35 |
| 1,524,473 | 1/1925 | Brinton | 280/79.11 |
| 2,113,689 | 4/1938 | Haban | 311/83 |
| 2,253,824 | 8/1941 | Townsend et al. | 16/35 |
| 2,319,589 | 5/1943 | Drinkwater | 280/47.35 |
| 2,654,897 | 10/1953 | Knopf | 5/36 |
| 3,036,722 | 7/1959 | Sharaway | 280/33.995 |
| 3,104,890 | 9/1963 | Hill | 280/47.18 |
| 3,407,959 | 10/1968 | Mondineu | 280/651 |
| 3,572,742 | 3/1971 | Marker | 414/10 |
| 3,782,746 | 1/1974 | Isaacs | 280/79.3 |
| 3,827,573 | 8/1974 | Guerette | 211/149 |
| 3,840,243 | 10/1974 | Rheinhart et al. | 280/79.3 |
| 3,971,568 | 7/1976 | Wright | 280/47.35 |
| 4,020,959 | 5/1977 | Livesay | 280/47.35 |
| 4,523,768 | 6/1985 | Dlubaca | 280/651 |
| 4,789,180 | 12/1988 | Bell | 280/47.33 |

FOREIGN PATENT DOCUMENTS

| | | | |
|---|---|---|---|
| 2598133 | 11/1987 | France | 280/47.18 |
| 306720 | 2/1929 | United Kingdom | 280/47.35 |

Primary Examiner—David M. Mitchell
Attorney, Agent, or Firm—James Creighton Wray

[57] ABSTRACT

A multi-purpose portable work bench cart has four wheels and two stacked shelves. The upper shelf is a table, which folds back to allow tall objects to be placed on the lower shelf. The cart frame is made of tubular stock. Parallel larger diameter sides extend forward and upward to a handle. Large inverted front and rear U's support a fold-away table hinged at one side. Front and rear V-shaped trusses and a rear axle support the lower shelf. V-shaped trusses connect the rear axle housing to the sides. Front wheels are pivoted on vertical members extended downward from the sides. A locking mechanism on the frame of the cart is lowered and engaged to act as a brake for the cart.

8 Claims, 3 Drawing Sheets

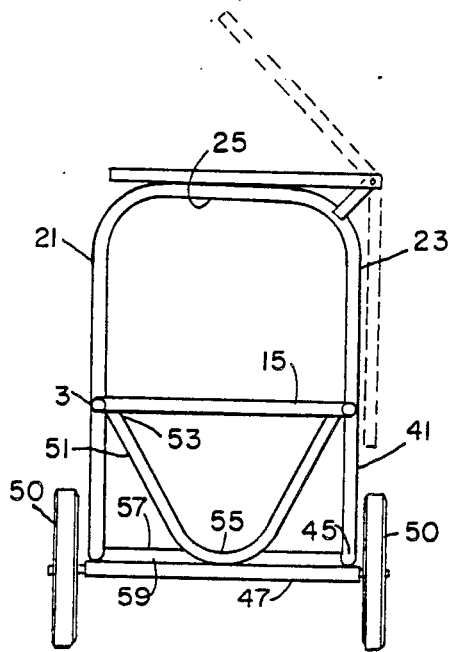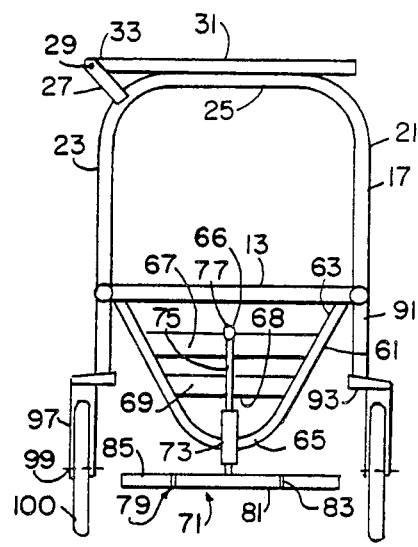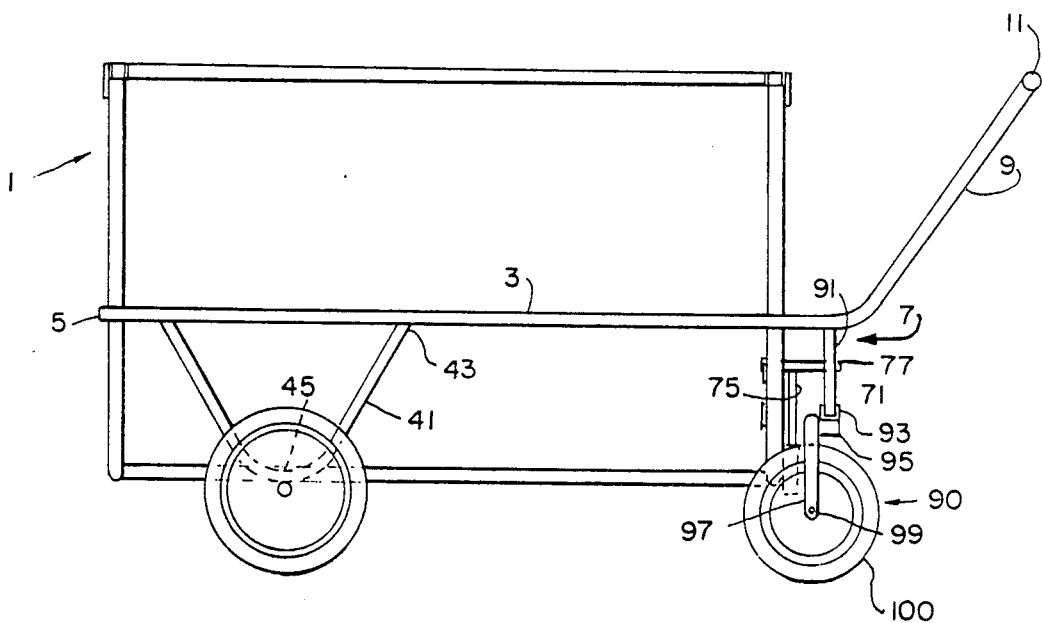

4,998,742

MULTI-PURPOSE PORTABLE WORKBENCH CART

BACKGROUND OF THE INVENTION

The invention relates to carts and portable workbenches.

A need exists for a portable workbench which is easily movable between locations and which converts to a convenient carrier. Heretofore known carts have either high centers of gravity which create troublesome tipping of loads and provide unstable or too low surfaces on which to conveniently work.

In one example of use of utility carts, horticulturists require transportation of heavy products to many locations and terrains. High center of gravity carts require high lifting of the heavy products, and low center of gravity carts do not provide comfortable work space when arriving at locations. Moreover, utility carts are not thought of as workbenches, and one tends to carry products from place to place and then either kneel or sit on the ground when working with plants, or sit on a low stool or crate and lean forward to the working space, all with attendant discomfort and strain.

A need exists for a work table which may be conveniently transported to locations, and a need exists for a low center of gravity cart made of lightweight materials which can easily carry products to remote locations without tipping or spilling the products and with ease of access to the products, and with unlimited height restrictions on products which may be carried, such as large plants or trees.

SUMMARY OF THE INVENTION

The present invention overcomes problems existing in the prior art by providing a work table which may be conveniently transported to remote locations and quickly assembled into a rigid table of conventional workbench height. The present invention at the same time provides a low center of gravity cart which is easily wheeled to remote locations with loads to which easy access is provided and for which no height restrictions exist.

A multi-purpose portable work bench cart has four wheels and two stacked shelves. The upper shelf is a table, which folds back to allow tall objects to be placed on the lower shelf. The cart frame is made of tubular stock. Parallel larger diameter sides extend forward and upward to a handle. Large inverted front and rear U's support a fold-away table hinged at one side. Front and rear V-shaped trusses and a rear axle support the lower shelf. V-shaped trusses connect the rear axle housing to the sides. Front wheels are pivoted on vertical members extended downward from the sides. A locking mechanism on the frame of the cart is lowered and engaged to act as a brake for the cart.

A preferred utility cart has first and second side members extending horizontally from a rear of the cart to a front of the cart along first and second sides. A handle is connected to forward ends of the side members and extends upwardly and forwardly therefrom. First and second cross members extend transversely between the side members at the rear of the cart and at the front of the cart respectively. The cross members have ends joined to the side members at intersections of the cross members and side members. First and second upright members extending upward from intersections with the cross members to an upper extremity and extend parallel to the cross members at positions spaced therefrom, thereby forming generally rectangular U-shaped members. First and second hinges are connected to the upright members near an upper extremity thereof at positions spaced upward from one of the side members. A work table has a generally rectangular shape and having dimensions generally similar to dimensions of the cross members and the side members between the cross members. The table has connections to the hinges adjacent corners of the table. The table may be positioned along one side of the utility cart in a first lowered position and may be positioned across the upper support members in a second operative position of the table. First and second side truss members extend downward from the first and second side members respectively at positions near the rear of the cart. A fixed axle member is connected to bottom portions of the first and second side truss members and extends transversely across the cart, first and second wheels having first and second wheel axle members are connected to the fixed axle member.

The preferred utility cart further has a rear truss member and a forward truss member having upper ends respectively connected to the first and second cross members and extending downward therefrom. A bottom shelf is positioned above the fixed axle member and extends between the rear and front truss members. Rear and front connections respectively connect lower portions of the rear and front truss members to rear and front edges respectively of the bottom shelf. The bottom shelf has side edges positioned within lower portions of the first and second side truss members. The bottom shelf is fixed above the first axle member and between the truss members for supporting loads on the bottom shelf.

In a preferred embodiment of the utility cart a support is connected to the forward truss member and extends downward therefrom, and a foot member on the bottom of the support which contacts the ground. Preferably the support is adjustable between a locked upper position in which the support is inoperative and a locked downward position in which the support is operative.

The preferred utility cart further has first and second wheel supports having upper ends connected to the side members at a front of the cart and extending downward therefrom. First and second pivoted wheels are connected at lower ends of the supports.

This invention provides a multi-purpose portable workbench cart having wheels for transporting the workbench cart. A frame is connected to the wheels. A lower shelf is connected to the frame near the wheels for transporting products on the workbench cart. A handle connected to the frame moves the workbench cart. Upright members connected to the frame support a workbench. A workbench is connected at the top of the upright members for providing a bench which may be transported by the frame and wheels.

In the preferred multi-purpose portable workbench cart, one side of a workbench is hinged to the upright members along one side of the frame. The workbench may be folded to a vertically oriented downward position along the frame for transporting large objects on the lower shelf. The workbench is movable from the stored vertical position to a horizontal position atop upright members for using as a workbench.

In a preferred embodiment, the frame includes a vertical shelf-supporting member with horizontal cross pieces. A short vertical tubular member is connected to the front frame member. A vertical pipe mounted within the tubular member vertically slides therein. The vertical pipe has a handle at an upper end and a foot at a bottom end. The handle respectively contacts an upper portion of a first upper cross member and a lower portion of a lower cross member for holding the foot in inoperative position where the handle contacts the upper cross member, and in an operative ground-engaging position when the handle contacts the lower cross member.

In the preferred multi-purpose portable workbench the wheels include first and second fixed axis wheels mounted on an axle extending across the cart and first and second caster mounted wheels mounted on caster support members at one longitudinal end of the frame.

Preferably the frame has a generally horizontally oriented tubular box member. First and second tubular side truss members extend downward from the tubular box member to a position beneath the bottom shelf. First and second tubular end truss members extend downward from the tubular box member to positions at ends of the lower shelf and are secured to the horizontal frame member and to the lower shelf for supporting the lower shelf between the first and second end tubular truss members and the first and second side tubular truss members.

In a preferred embodiment of the multi-purpose portable workbench cart the first end truss member has upper and lower horizontal members. The upper horizontal member has a centered upward groove, and the lower horizontal member has a centered lower groove. A short tubular slide is vertically mounted to a lower end of the first end truss member. A vertical tube slides in the vertical slide. A handle at the top of the tube selectively engages the first or second groove. A foot at the bottom of the tube engages the ground as a parking stand when the handle is engaged with the lower groove, and is spaced from the ground in an inoperative position when the handle is in contact with upper groove.

In the preferred multi-purpose portable workbench, the upright members are first and second vertically oriented inverted U-shaped tubular members having generally flat horizontal cross sections and having spaced vertical ends connected to the horizontal tubular box member.

In a preferred embodiment of the multi-purpose portable workbench, the frame member has parallel longitudinal tubular side members extending from a rear of the workbench to positions forward of the workbench and bent upward and extending upward and forward to upper extremities. A handle is a horizontal tubular member connected to forward upper extremities of the parallel tubular side members. Forward and rearward cross members are connected between the tubular side members. Forward and rearward truss members are connected to the cross members, extend downward therefrom and are connected at lower extremities thereof to front and rear ends of a lower shelf. First and second side truss members are connected to the first and second tubular side members respectively and extend downward therefrom on opposite sides of the lower shelf. An axle is connected between lower portions of the first and second side truss members.

These and other and further objects and features of the invention are apparent in the disclosure, which includes the above and ongoing specification, with the claims, and the drawings.

BRIEF DESCRIPTION OF THE DRAWINGS

FIG. 6 is a rear view of the cart.

FIG. 7 is a front view of the cart showing the parking stand in raised position.

FIG. 8 is a side view of the cart.

DETAILED DESCRIPTION OF THE DRAWINGS

Figure 1:
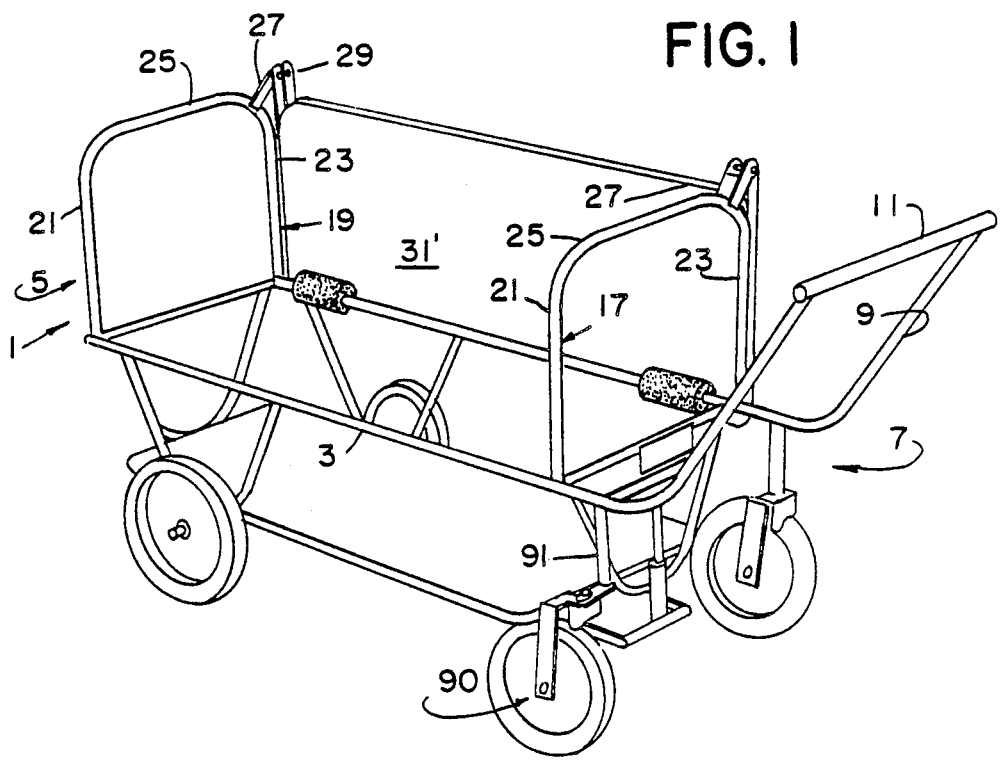
FIG. 1 is a front perspective view showing the work table in lowered position.
Figure 2:
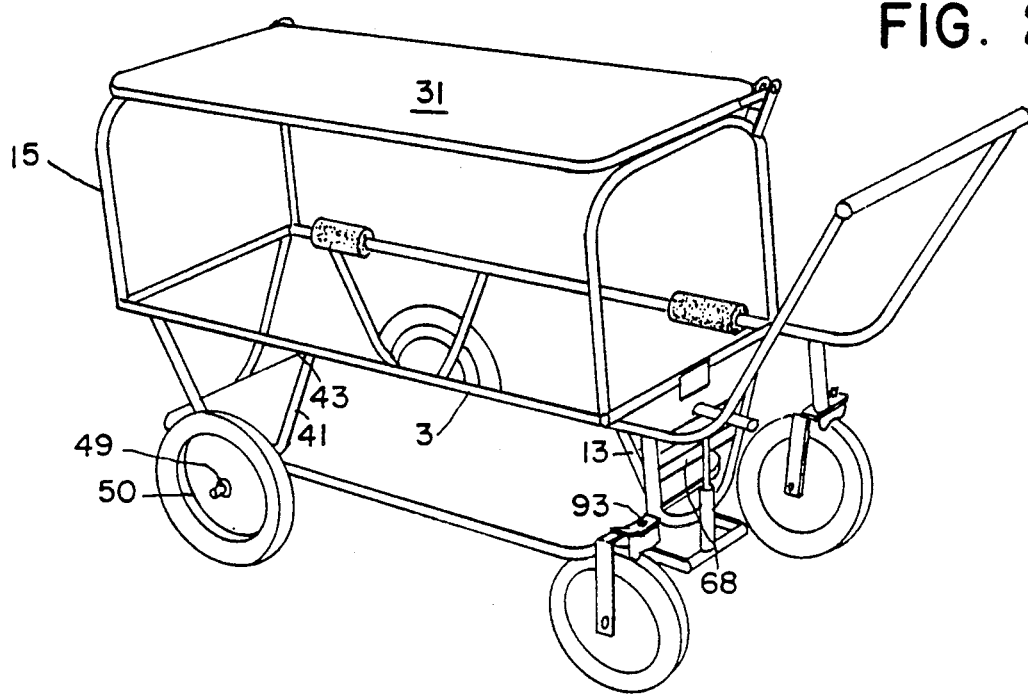
FIG. 2 is a front perspective view showing the work table in raised position.
Figure 3:
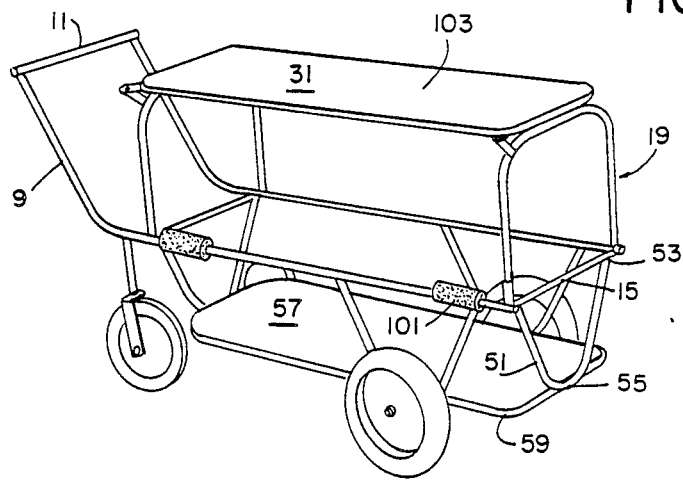
FIG. 3 is a rear perspective view showing the work table in raised position.

Referring to the drawings, a portable work table cart is generally indicated by the numeral 1. The cart has first and second parallel side frames 3 which extend from a rear of the cart 5 to a front of the cart 7, and then upward 9 to a cross handle 11. Front and rear transverse members 13 and 15 extend between the side members, forming a generally rectangular plan form. Front and rear U-shaped upright members 17 and 19 have vertical side portions 21 and 23 welded at their lower ends to the side members 3. The upper ends of the vertical members 21 and 23 are joined by cross members 25. At the intersections of vertical members 23 and horizontal members 25, slanted lugs 27 are welded. The lugs 27 extend outward and upward at 45° angles from the back of rear upright member 17, and from the front of front upright member 19. Hinge pins 29 extend through outer ends of the lugs parallel to the side members 3. Work table 31 is mounted on the hinge pins 29 for resting on top of the upper cross members 25 of the front and rear U-shaped upright supports 17 and 19. Work table 31 has outward extending lugs 33 which are mounted on the hinge pins 29 so that the work table may be moved to its lowered position 31' when the cart is moved from place to place.

Side V-shaped truss members 41 have upper ends 43 welded to the side members 3. Lower ends 45 of the V-shaped truss members are welded to an axle housing 47, which extends across the cart near a rear end. An axle 49 is mounted in the housing and wheels 50 are mounted on opposite ends of the housing. A rear V-shaped truss member 51 has upper ends 53 welded to cross member 15. A lower end 55 of the rear truss supports a lower shelf 57.

Front truss member 61 has upper ends 63 connected to front cross member 13. Lower end 65 of front truss member 61 is connected to the shelf.

The lower ends 45, 55 and 65 of the truss members may be secured to the shelf by bolting the truss members to the shelf. Preferably the lower shelf member 57 is surrounded by a metal frame 59 and the lowers ends 45, 55 and 65 of the truss members are welded to the frame 59.

In one embodiment, it is only necessary to connect the shelf 57 to the lower end 65 of the front truss member. The shelf 57 rests on the axle housing 47 and is prevented from rearward movement by the lower end 55 of the rear truss member 51.

In a preferred embodiment, the entire frame of the cart, including the side members 3, the cross members 13 and 15, the upright members 17 and 19, and the truss members 41, 51 and 61, are all made of tubular materials which are welded at their joints.

Front truss member 61 has upper and lower cross members 67 and 69 connected thereto. The upper cross member 67 has an upward opening groove 66, and the lower cross member 69 has a lower opening groove 68. A parking stand 71 slides in mounting tube 73 welded to a lower end 65 of the front truss member 61. A vertical tube 75 is mounted within the mounting tube, and a handle 77 is welded transversely at the upper end of tube 75. The handle 77 fits within the upward opening groove 66 to hold the parking stand 71 upward, and fits within the downward opening groove 68 to hold the parking stand in its downward operative position in which the foot 79 of the parking stand engages the ground. In a preferred embodiment, the foot 79 of the parking stand comprises a horizontal tube 81 connected to a lower end of the vertical tube 75. First and second rigid strap members 83 extend rearward from opposite ends of tubular member 81 and a rearward-opening U-shaped strap member 85 is connected to rearward ends of strap members 83. The vertical strap members 83 and 85 tend to prevent sliding of the parking stand, while the rounded tube 81 and the strap members which are spread over an extensive area tend to prevent sinking of the parking stand into the ground.

At the front of the cart vertical members 91 have upper ends welded to side member tubes 3. Outward extending flanges 93 at lower ends of the vertical tubes 91 support caster wheel assemblies generally indicated by the numeral 90, which include vertical-axis bearings 95, vertical caster wheel supports 97, and stub axles 99 on which the caster wheels 100 are mounted.

Figure 4:
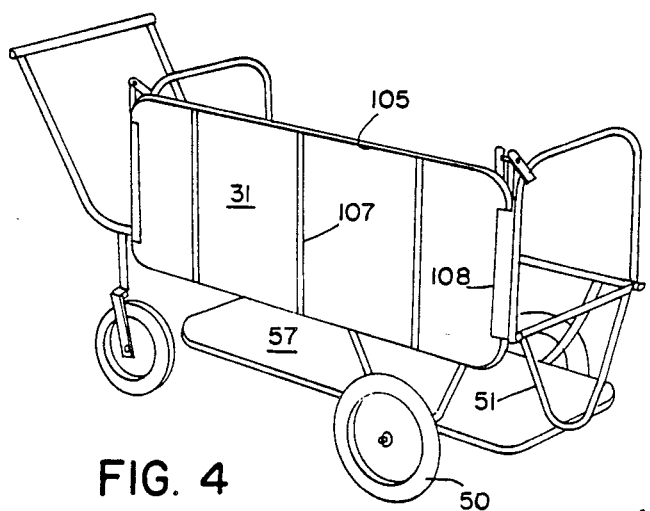
FIG. 4 is a rear perspective view showing the work table in lowered position.
Figure 5:
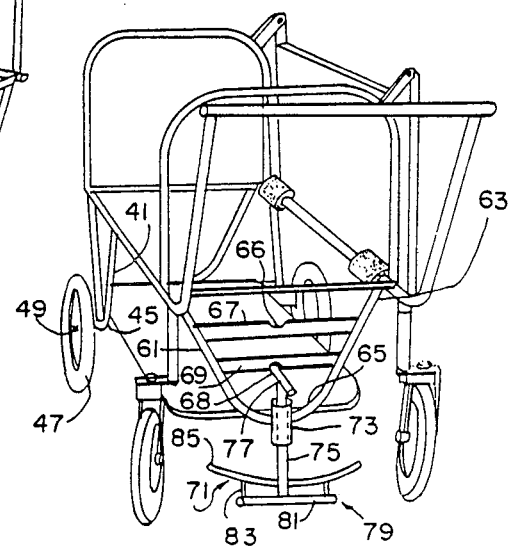
FIG. 5 is a front perspective view showing the parking stand lowered and engaged with the ground to hold the cart and workbench in fixed position.

As shown in the perspective views 1, 2, 3 and 5, one side member is provided with cushioned sleeves 101 which engage the upper surface 103 of table 31 when the table is in its lowered position. As best shown in FIG. 4, the work table 31 is supplied with a frame 105, which extends around the work table and which has cross members 107 which support the work table. Cleats 108 extending inward from the end portions of the frame 105 engage the upper horizontal members 25 of the front and rear upright members 17 and 19.

As shown in the perspective view, the supporting lugs 27 and 33, which support the hinge pin 29, are double to provide extra support when the table is in its lowered position 31', and to provide stability when raising the table to properly align the table on the upright members, and to hold the table aligned with the upright members during use of the work table.

While the invention has been described with reference to specific embodiments, modifications and variations of the invention may be made without departing from the scope of the invention.

I claim:

1. A utility cart comprising first and second side members extending horizontally from the rear of the cart to the front of the cart along first and second sides, a handle connected to forward ends of the side members and extending upwardly and forwardly therefrom, first and second cross members extending transversely between the side members at the rear of the cart and at the front of the cart respectively, the cross members having ends joined to the side members at intersections of the cross members and side members, first and second upright members extending upward from intersections of the cross members to an upper extremity and then extending parallel to the cross members at positions spaced therefrom, thereby forming generally rectangular U-shaped members, first and second hinges connected to the upright members near an upper extremity thereof at positions spaced upward from one of the side members, a work table having a generally rectangular shape and having dimensions generally similar to dimensions of the cross members and the side members between the cross members, the table having connections to the hinge means adjacent corners of the table whereby the table may be positioned along one side of the utility cart in a lowered position and may be positioned across the upper support members in a second operative position of the table, first and second truss members extending downward from the first and second side members respectively at positions near the first end of the cart, a first axle member connected to bottom portions of the first and second truss members and extending transversely across the cart, first and second wheels having first and second wheel axle members connected to the fixed axle member, further comprising a rear truss member and a forward truss member having upper ends respectively connected to the first and second cross members and extending downward therefrom, a bottom shelf positioned above the fixed axle member and extending between the rear and front truss members, rear and front connections for respectively connecting lower portions of the rear and front truss members to rear and front edges respectively of the bottom shelf, the bottom shelf having side edges positioned within lower portions of the first and second and side truss members, the bottom shelf being fixed above the first axle member and between the truss members for supporting loads on the bottom shelf.

2. The utility cart of claim 1, further comprising a support connected to the forward truss member and extending downward therefrom and a foot member on the bottom of the support for contacting the ground.

3. The utility cart of claim 2, wherein the support is adjustable between a locked upper position in which the support is inoperative and a locked downward position in which the support is operative.

4. A multi-purpose portable workbench cart comprising wheels for transporting the workbench cart, a frame connected to the wheels, a lower shelf connected to the frame near the wheels for transporting products for the workbench cart, a handle connected to the frame for moving the workbench cart, upright members connected to the frame for supporting a workbench, and a workbench connected at the top of the upright members for providing a bench which may be transported by the frame and wheels, wherein the upright members comprise first and second vertically oriented inverted U-shaped members having generally flat horizontal cross-section and having spaced ends connected to a horizontal tubular box member, wherein one side of a workbench is hinged to the upright members along one side of the frame whereby the workbench may be folded to a downward vertically oriented position along the frame for transporting large objects on the lower shelf, the workbench being movable from the stored vertical position to a horizontal position atop the upright members for using as a workbench, wherein the frame includes a vertical shelf-supporting member with horizontal cross pieces, and wherein a short vertical tubular member is connected to the front frame member, and further comprising a vertical pipe mounted within the tubular member for vertically sliding therein, the vertical pipe having a handle at an upper end thereof and a foot at a bottom end thereof and means on the handle for respectively contacting an upper portion of a first upper cross member and a lower portion of a lower cross member for holding the foot in inoperative position when the handle contacts the upper cross member, and in an operative ground engaging position when the handle contacts the lower cross member.

5. A multi-purpose portable workbench cart comprising wheels for transporting the workbench cart, a frame connected to the wheels, a lower shelf connected to the frame near the wheels for transporting products for the workbench cart, upright members connected to the frame moving the workbench cart, upright members connected to the frame for supporting a workbench, and a workbench connected at the top of the upright members for providing a bench which may be transported by the frame and wheels, wherein the upright members comprise first and second vertically oriented inverted U-shaped members having generally flat horizontal cross-section and having spaced ends connected to a horizontal tubular box member, wherein the wheels comprise first and second fixed axis wheels mounted on an axle extending across the cart and first and second caster mounted wheels mounted on caster support members at one longitudinal end of the frame, wherein the frame comprises a generally horizontally oriented tubular box member, first and second tubular side truss members extending downward from the tubular box member to a position beneath the bottom shelf, and first and second tubular end truss members extending downward form the tubular box member to positions at ends of the lower shelf and being secured to the horizontal frame member and to the lower shelf for supporting the lower shelf between the first and second end tubular truss members and the first and second side tubular truss members.

6. The multi-purpose portable workbench cart apparatus of claim 5 wherein the first end truss member has upper and lower horizontal members, the upper horizontal member having a centered upward groove and the lower horizontal member having a centered lower groove, a short tubular slide vertically mounted to a lower end of the first end truss member, a vertical tube slideable in the vertical slide, a handle at the top of the tube for selectively engaging the first or second groove, a foot at the bottom of the tube for engaging the ground as the parking stand when the handle is engaged with the lower groove and for spacing from the ground in an inoperative position when the handle is in contact with upper groove.

7. A multi-purpose portable workbench cart comprising wheels for transporting the workbench cart, a frame connected to the wheels, a lower shelf connected to the frame near the wheels for transporting products for the workbench cart, a handle connected to the frame for moving the workbench cart, upright members connected to the frame for supporting a workbench, and a workbench connected at the top of the upright members for providing a bench which may be transported by the frame and wheels, wherein the upright members comprise first and second vertically oriented inverted U-shaped members having generally flat horizontal cross-section and having spaced ends connected to a horizontal tubular box member, wherein the frame comprises medial parallel longitudinal tubular bars extending from a rear of the workbench to positions forward of the workbench and bent upward and extending upward and forward to upper extremities, and wherein the handle comprises a horizontal tubular member connected to forward upper extremities of the parallel tubular side members, forward and rearward cross members connected between the tubular members, forward and rearward truss members connected to the cross members and extending downward therefrom and connected at lower extremities thereof to front and rear ends of the lower shelf, and further comprising first and second side truss members connected tot he first and second tubular side member respectively and extending downward therefrom on opposite side of the lower shelf, and axle means connected between lower portions of the first and second side truss members.

8. A multi-purpose portable workbench cart comprising wheels for transporting the workbench cart, a frame connected to the wheels, a lower shelf connected to the frame near the wheels for transporting products for the workbench cart, a handle connected to the frame for moving the workbench cart, upright members connected to the frame for supporting a workbench, and a workbench connected at the top of the upright members for providing a bench which may be transported by the frame and wheels, wherein the upright members comprise first and second vertically oriented inverted U-shaped members having generally flat horizontal cross-sections and having spaced ends connected to a horizontal tubular box member, wherein the wheels comprise first and second fixed axis wheels mounted on an axle extending across the cart and first and second caster mounted wheels mounted on caster support members at one longitudinal end of the frame, wherein the frame comprises a generally horizontally oriented tubular box member, first and second tubular side truss members extending downward from the tubular box member to a position beneath the bottom shelf, and first and second tubular end truss members extending downward form the tubular box member to positions at ends of the lower shelf and being secured to the horizontal frame member and to the lower shelf for supporting the lower shelf between the first and second end tubular truss members and the first and second side tubular truss members, wherein the first end truss member has upper and lower horizontal members, the upper horizontal member having a centered upward groove and the lower horizontal member having a centered lower groove, a short tubular slide vertically mounted to a lower end of the first end truss member, a vertical tube slidable in the vertical slide, a handle at the top of the tube for selectively engaging the first or second groove, a foot at the bottom of the tube for engaging the ground as the parking stand when the handle is engaged with the lower groove and for spacing from the ground in an inoperative position when the handle is in contact with upper groove, wherein the upright members comprise first and second vertically oriented inverted U-shaped members having generally flat horizontal cross sections and having spaced ends connected to the horizontal tubular box member.

* * * * *